US011966748B2

(12) United States Patent
Nasim et al.

(10) Patent No.: US 11,966,748 B2
(45) Date of Patent: Apr. 23, 2024

(54) DYNAMIC BOOT CONFIGURATION

(71) Applicant: ATI Technologies ULC, Markham (CA)

(72) Inventors: Kamraan Nasim, Markham (CA); Erez Koelewyn, Markham (CA); Shadi Dashmiz, Markham (CA)

(73) Assignee: ATI Technologies ULC, Markham (CA)

( * ) Notice: Subject to any disclaimer, the term of this patent is extended or adjusted under 35 U.S.C. 154(b) by 221 days.

(21) Appl. No.: 17/490,303

(22) Filed: Sep. 30, 2021

(65) Prior Publication Data

US 2023/0099455 A1    Mar. 30, 2023

(51) Int. Cl.
*G06F 15/177* (2006.01)
*G06F 9/4401* (2018.01)
*H04L 9/32* (2006.01)

(52) U.S. Cl.
CPC .......... *G06F 9/4403* (2013.01); *H04L 9/3242* (2013.01); *G06F 9/4401* (2013.01); *G06F 9/4411* (2013.01)

(58) Field of Classification Search
CPC . G06F 9/4403; H04L 9/3242; H04L 2209/34; H04L 9/0894; H04L 9/0643
USPC ............................................................. 713/2
See application file for complete search history.

(56) References Cited

U.S. PATENT DOCUMENTS

| | | | | |
|---|---|---|---|---|
| 10,192,056 B1* | 1/2019 | Goel | ...................... | G06F 21/575 |
| 2002/0161870 A1* | 10/2002 | French | .................... | H04L 67/34 |
| | | | | 709/237 |
| 2002/0161995 A1* | 10/2002 | French | .................. | G06F 9/4416 |
| | | | | 713/2 |
| 2014/0047341 A1* | 2/2014 | Breternitz | ............... | G06F 16/23 |
| | | | | 715/735 |
| 2015/0363320 A1* | 12/2015 | Kumar | ..................... | G06F 21/57 |
| | | | | 711/103 |
| 2016/0323276 A1* | 11/2016 | Flett | .................... | G06Q 20/1085 |
| 2016/0334852 A1* | 11/2016 | Calhoun | ................... | G06F 1/26 |
| 2017/0003977 A1* | 1/2017 | Sumida | ..................... | G06F 9/50 |
| 2018/0121210 A1* | 5/2018 | Costa | .................... | G06F 9/4418 |
| 2018/0336039 A1* | 11/2018 | Roh | ....................... | G06F 9/4416 |
| 2019/0026029 A1* | 1/2019 | Lee | ......................... | G06F 3/0659 |
| 2019/0278620 A1* | 9/2019 | Korbar | ................ | G06F 9/45558 |

(Continued)

*Primary Examiner* — Volvick Derose
(74) *Attorney, Agent, or Firm* — Hickman Becker Bingham Ledesma LLP

(57) ABSTRACT

Techniques described herein provide users with the ability to persistently adjust settings for boot-time features (BTF) of a computing device. A user requests a particular BTF configuration adjustment for a device via a device driver. The driver instructs trusted firmware of the device to store a boot override record in persistent storage accessible by a bootloader for the device. Upon implementation of the boot sequence for the device, the bootloader applies the changes reflected in the record to BTF configuration data. The boot override information is persistently available to the bootloader, which ensures that the configuration changes that the boot override record(s) represent are applied to the BTFs of the device until the boot override record(s) are cleared or invalidated. Further, to ensure the security of boot override record(s), the trusted firmware generates, for each record, an HMAC tag using an HMAC key derived from a Chip Endorsement Fused Secret from the hardware.

20 Claims, 3 Drawing Sheets

(56) References Cited

U.S. PATENT DOCUMENTS

| | | | |
|---|---|---|---|
| 2020/0050543 A1* | 2/2020 | Hong | G06F 9/4403 |
| 2021/0004242 A1* | 1/2021 | Su | G06F 9/4416 |
| 2022/0129281 A1* | 4/2022 | Jacobson | G06F 9/4416 |

* cited by examiner

FIG. 3

FEATURE UPDATE PERSISTENCE AREA (FUPA) 128

| BOOT-TIME FEATURE CONFIGURATION DATA | HMAC | TIMESTAMP |
|---|---|---|
| MEMORY_INTERCONNECT_ ENABLED = FALSE; GDDR6_ECC_BLOCK_SIZE = 2048 | HMAC1 | TIMESTAMP1 |

300

DYNAMIC BOOT CONFIGURATION

BACKGROUND

A computing device, such as a graphics processing unit (GPU), a central processing unit (CPU), or an accelerated processing unit (APU), generally operates using default configuration values for boot-time features of the device. These boot-time features are initialized, by a bootloader process during a boot sequence, e.g., using configuration values maintained for the bootloader process. For example, dynamic random-access memory (DRAM) error correcting codes (ECC) is a boot-time feature that may be implemented for a computing device to enhance the accuracy of information written to device memory. DRAM ECC may be initialized during the boot sequence of the device using one or more configuration values in BIOS data for the computing device. As another example, the option to allow a computing device, such as a GPU, to directly share information with other hardware (referred to herein as "memory-interconnect") is a boot-time feature that may be enabled by default, e.g., in a system comprising a multi node GPU (also referred to as a "GPU Hive"), which is described in further detail below. As a default boot-time feature, memory-interconnect is initialized by a bootloader process of the computing device during a boot sequence of the device.

Certain use cases for a multi-purpose GPU, CPU or APU do not require boot-time features to be operated based on default configuration values. For example, a user may not wish for memory-interconnect to be enabled if there is a desire to decouple a GPU Hive and operate all the GPUs as individual devices, as per a default GPU configuration. Accordingly, a user may indicate, via a driver for the computing device, a preference for one or more boot-time feature configuration adjustments, such as disabling memory-interconnect. To apply these preferences, the device driver stores the preference data in a dedicated location in memory (either integrated with the device or external to the device) and causes the device to undergo a warm reboot during which power is maintained to the device and the memory. In connection with execution of a boot sequence following the warm reboot, a bootloader process for the device accesses the preference data within the location in memory and applies the updated configuration information for the boot-time features.

However, any cold reboot (during which power is not maintained to the memory) will wipe the memory. Thus, after a cold reboot, the bootloader process will initialize the boot-time features using the default configuration settings. After cold reboot, the user would need to again request the adjustment to the boot-time features and warm-reboot the device to apply the adjustment.

A user may persistently adjust a default boot-time feature configuration by obtaining/building a BIOS image, in which the desired boot-time settings are adjusted, and flashing the BIOS on the computing device to update the BIOS firmware. To illustrate flashing the BIOS of a computing device (e.g., a GPU), a user would cause a new BIOS firmware image that reflects updated values for one or more boot-time feature settings (such as a video BIOS (vBIOS) image in which memory-interconnect is disabled) to be stored in a storage device that is communicatively coupled to the computing device. During a reboot of the computing device, the updated BIOS is copied to a boot medium of the device, such as a Flash EEPROM implementing a serial peripheral interface ("SPI-ROM").

However, generating an updated BIOS image requires a very high level of expertise. As such, it is generally inadvisable for a user to build or manually adjust a BIOS for a computing device, or obtain a BIOS image from a non-manufacturer source, since introduction of erroneous or malicious instructions into the boot sequence of the device could cause permanent damage to the device. Nevertheless, the manufacturer of the device may not provide a BIOS image with a configuration that exactly matches a user's boot-time feature configuration preference. Additionally, in some cases, in order for a user to initiate updating the BIOS for a computing device, a special Flash Programmer I2C connection for the computing device is required to allow the BIOS to be flashed by a hardware flash utility instead of using an OEM (manufacturer) provided software flash utility.

As such, it would be beneficial to allow users to make persistent changes to the settings for boot-time features of a computing device without exposing the boot sequence of the device to security vulnerabilities and without requiring special computing device connections to affect the desired changes.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

Techniques herein are depicted by way of example, and not by way of limitation, in the figures of the accompanying drawings and in which like reference numerals refer to similar elements.

FIG. 3 depicts a dedicated feature update persistence area, in persistent storage of a computing device, containing an example boot-time feature configuration boot override record.

DETAILED DESCRIPTION

Figure 1:
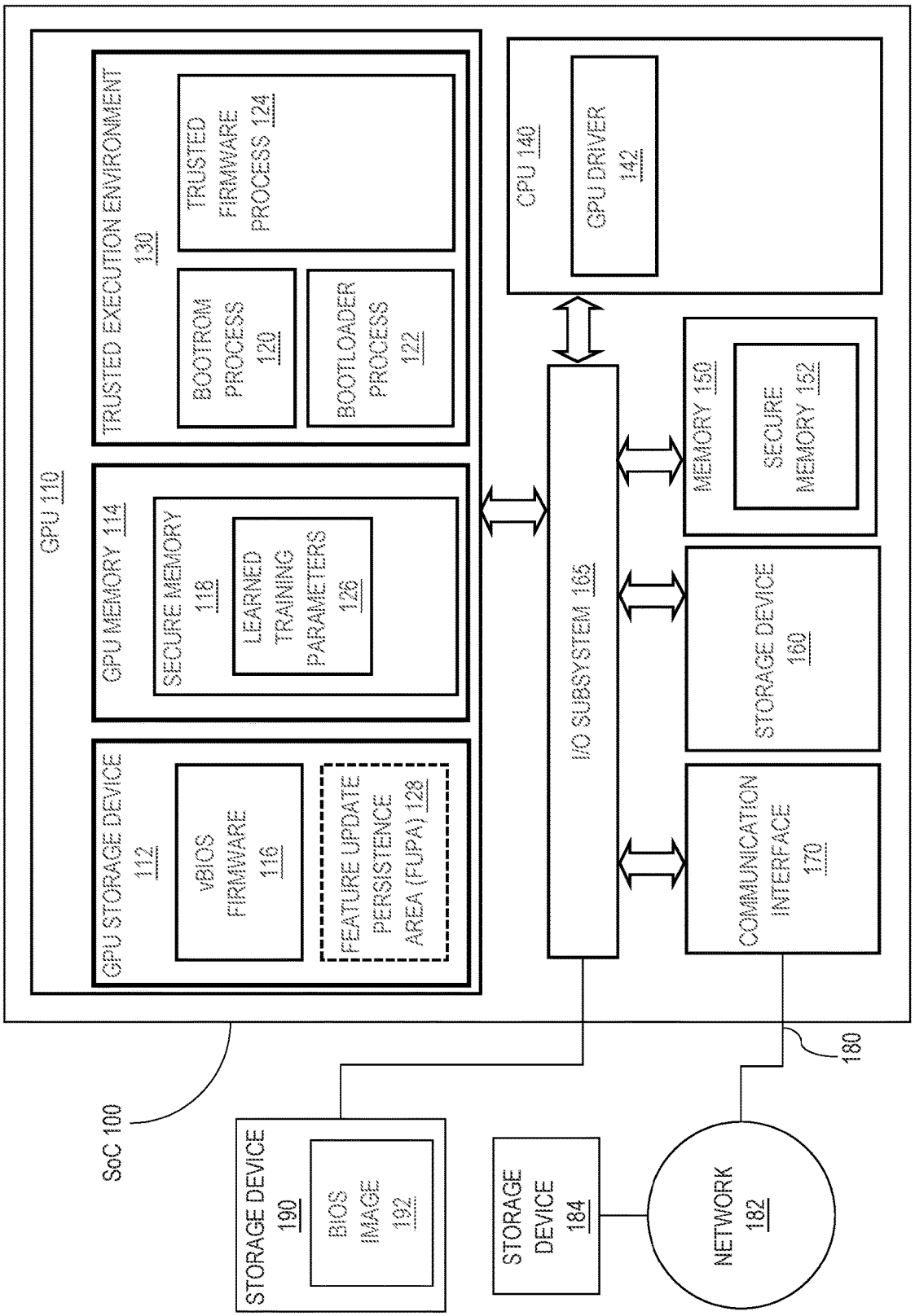
FIG. 1 is a block diagram that depicts an example computing device.

In the following description, for the purposes of explanation, numerous specific details are set forth in order to provide a thorough understanding of the described techniques. It will be apparent, however, to one skilled in the art that the techniques described herein may be practiced without these specific details. In other instances, well-known structures and devices are shown in block diagram form in order to avoid unnecessarily obscuring the described techniques.

1. Overview

Techniques described herein provide users with the ability to persistently adjust settings for boot-time features of a computing device. Examples of boot-time features for a GPU include, without limitation, memory-interconnect, Two-Stage Memory Training, and DRAM ECC. The ability of a user to flexibly adjust the boot-time feature configuration of a given computing device, as needed, reduces the need to flash the device BIOS firmware or to repeatedly apply configuration adjustments after each cold reboot. Thus, the computing resources required to apply boot-time feature configuration adjustments is reduced and the process of boot-time feature configuration adjustment is streamlined for the user.

Furthermore, the number of times a BIOS flash operation is needed to adjust the default boot-time feature configuration is reduced by techniques described herein, which prevents potential SPI-ROM sector wearing due to the entire SPI flash being erased and re-written with each BIOS flash operation. Specifically, persistent adjustments of particular aspects of boot-time configuration cause erase-rewrite operations over only a select sector within SPI-ROM where the dynamic boot configuration is persisted, which reduces overall wear to the storage device.

Specifically, a user may request a particular boot-time feature configuration adjustment for a computing device via a user interface of the device driver. In response to such a request, the driver instructs trusted firmware of the device to store, in persistent storage, one or more boot-time feature configuration adjustment boot override records ("boot override records"). The trusted firmware stores boot override records in a dedicated feature update persistence area of a persistent storage device accessible by a bootloader process for the computing device.

Upon implementation of the boot sequence for the device (i.e., via warm or cold reboot), the bootloader process loads one or more stored boot override records into memory, and applies the changes reflected in the one or more records to the boot-time feature configuration data on which initialization of the boot-time features is based. These one or more boot override records are available to the bootloader process every time the device boots up, which ensures that the configuration changes that the one or more boot override records represent are applied to the boot-time features of the device until the one or more boot override records are cleared or invalidated.

To ensure the security of boot override records, the trusted firmware of the computing device generates, for each record, a keyed-hash message authentication code (HMAC) tag using an HMAC key derived from a Chip Endorsement Fused Secret (CEFS). The CEFS is unique to the hardware of the computing device, and is accessible only by processes running on the device. As such, the HMAC tag generated by the trusted firmware may be authenticated by the bootloader process (which also has access to the CEFS), whereby the bootloader process may verify that the associated boot override record is from a trusted source. According to various implementations, the bootloader process copies any boot override records found in persistent storage into secure memory prior to authenticating the records to ensure that the boot override records are not adjusted after authentication.

According to various implementations, boot override records enable interoperability between two mutually-exclusive boot-time features, where one or more aspects of a first boot-time feature are incompatible with a second boot-time feature. To illustrate, the first boot-time feature is enabled by default. After device initialization during which the first feature is implemented based on the default configuration, the device driver automatically causes the trusted firmware of the device to persistently store a boot override record that enables the second boot-time feature and disables the one or more incompatible aspects of the first boot-time feature. (If such a boot override record is already stored in persistent storage, the boot override record is marked as valid.) After storage of the boot override record, the device is rebooted (warm or cold), and the bootloader automatically applies the configuration adjustments indicated in the stored boot override record. Thus, the second boot-time feature is enabled and the one or more aspects of the first boot-time feature are disabled.

One non-limiting example use case for enabling interoperability between two mutually-exclusive boot-time features using boot override records is enabling both DRAM ECC and Two-Stage Memory Training, which cannot be enabled simultaneously, for a given GPU. In this use case, Two-Stage Memory Training is enabled by default, which causes the first stage of the memory training, which generates memory training configuration parameters, to be completed. Subsequent to completion of the first stage of memory training, the GPU driver causes the trusted firmware of the GPU to store a boot override record that disables Two-Stage Memory Training and enables DRAM ECC, and the GPU is warm-rebooted. During the boot sequence, the bootloader uses the stored memory training configuration parameters to configure the memory according to the second stage of memory training, and then wipes the memory to enable DRAM ECC. Thus, both DRAM ECC and Two-Stage Memory Training are enabled in the contiguous boot cycles.

2. Architecture

FIG. 1 is a block diagram that depicts an example computing device, i.e., system on a chip (SoC) 100, which implements techniques described herein. Example SoC 100 is an integrated circuit that comprises an example set of subsystems including: a GPU 110, a central processing unit (CPU) 140, memory 150, a persistent storage device 160 (such as EEPROM), an input/output (I/O) subsystem 165, and a communication interface 170. SoC 100 may include other subsystems not depicted in FIG. 1.

Techniques are described herein as being implemented by GPU 110. However, techniques described herein are not limited to being implemented by a GPU, and may be implemented by a CPU, an APU, etc.

As shown in FIG. 1, GPU 110 also comprises GPU storage device 112 (e.g., SPI-ROM) and GPU memory 114 (e.g., GDDR6 DRAM). Storage device 112 acts as a boot medium, comprising vBIOS firmware 116, bootloader firmware, trusted process firmware, and any rich execution environment firmware used to initialize and boot up GPU 110.

Furthermore, GPU 110 implements a trusted execution environment (TEE) 130. A trusted execution environment comprises any process or hardware that uses secure memory and secure registers. Processes and hardware that are part of a trusted execution environment are referred to herein as "trusted actors". According to various implementations, instructions that implement operations performed by trusted actors are authenticated prior to the operations being performed. Operations being performed by trusted actors within a trusted execution environment on a given computing device, and data being produced by such operations, are not accessible or changeable by any actor (process or hardware) operating outside of the trusted execution environment. Example implementations of trusted execution environments include AMD Security Processor (ASP), Intel Software Guard Extensions (SGX), Apple Secure Enclave Processor (SEP), Microsoft IP (Pluton Processor) etc.

According to various implementations, TEE 130 is implemented by a dedicated security microcontroller of GPU 110 that is a "root-of-trust" controller. According to various implementations, TEE 130 is instead implemented by a processor that also implements a non-trusted (or "rich") execution environment. In this case, TEE 130 is guaranteed to be secure based on one or more security measures such as a security perimeter, encryption, authentication of software/firmware updates, etc.

FIG. 1 depicts trusted actors, including a bootROM process 120, a bootloader process 122, and a trusted firmware process 124, residing within TEE 130 simultaneously. However, these processes generally do not function simultaneously, but instead implement sequential phases of the boot sequence for GPU 110. Specifically, when GPU 110 is first initialized, firmware (including vBIOS firmware 116) is loaded from the boot medium (e.g., GPU storage device 112) into secure memory 118. BootROM process 120 is run, within TEE 130, based on the loaded vBIOS firmware 116. BootROM process 120 initializes bootloader process 122 within TEE 130, which, in turn, initializes trusted firmware process 124 within TEE 130 (i.e., based on firmware loaded into secure memory 118). While bootROM process 120, bootloader process 122, and trusted firmware process 124 are referred to herein as singular, any number of processes may implement the vBIOS, the bootloader, and the trusted firmware, according to various implementations.

The trusted actors residing in TEE 130 access secure memory 118, which may comprise part or all of GPU memory 114. Furthermore, secure memory 118 may be implemented within a dedicated security microprocessor implementing TEE 130. Secure registers and memory are secured such that only trusted actors have access to the data in the secure registers and memory, e.g., because the registers and/or memory are encrypted, or because the registers and/or memory are accessible only by trusted actors from within TEE 130, etc. The trusted actors within TEE 130 access working data within SoC 100 based on security policies, which restrict the access and ensure security within SoC 100.

3. Boot Override Record vBIOS firmware 116 contains setting parameter values for boot-time features implemented by early bootloader firmware. Specifically, boot-time features are features implemented for GPU 110 by bootloader process 122, and potentially by other boot modules initialized by bootROM process 120 or bootloader process 122, (a) after bootloader process 122 is initialized by bootROM process 120 and (b) before bootloader process 122 initializes trusted firmware process 124. It is noted that some computing devices, such as CPUs and APUs, may use other types of processes (such as BIOS firmware) to implement the boot sequences for the devices. In such cases, a boot-time feature may be implemented by these other types of processes prior to initializing one or more run-time processes, such as processes implementing an operating system or a trusted execution environment as described herein.

According to various implementations, trusted firmware process 124 persists, within persistent storage accessible by the trusted actors in TEE 130, one or more boot override records comprising boot-time feature parameters (also referred to herein as "configuration data") to be applied during future boot sequences of GPU 110. The persistent storage containing one or more boot override records is described herein as being integrated with GPU 110, e.g., within GPU storage device 112. However, boot override records may be stored in persistent storage that is external to GPU 110.

According to various implementations, GPU storage device 112 includes a feature update persistence area (FUPA) 128, which is a defined region of GPU storage device 112 in which boot override records are stored. While bootloader process 122 implements at least a portion of the boot sequence for GPU 110, bootloader process 122 retrieves one or more boot override records from FUPA 128 and applies parameter settings indicated in the one or more records during the boot sequence. Because the boot override records are stored in persistent storage, bootloader process 122 applies the adjustments indicated in the records across cold and warm reboots until the boot override records are cleared or invalidated.

Figure 2:
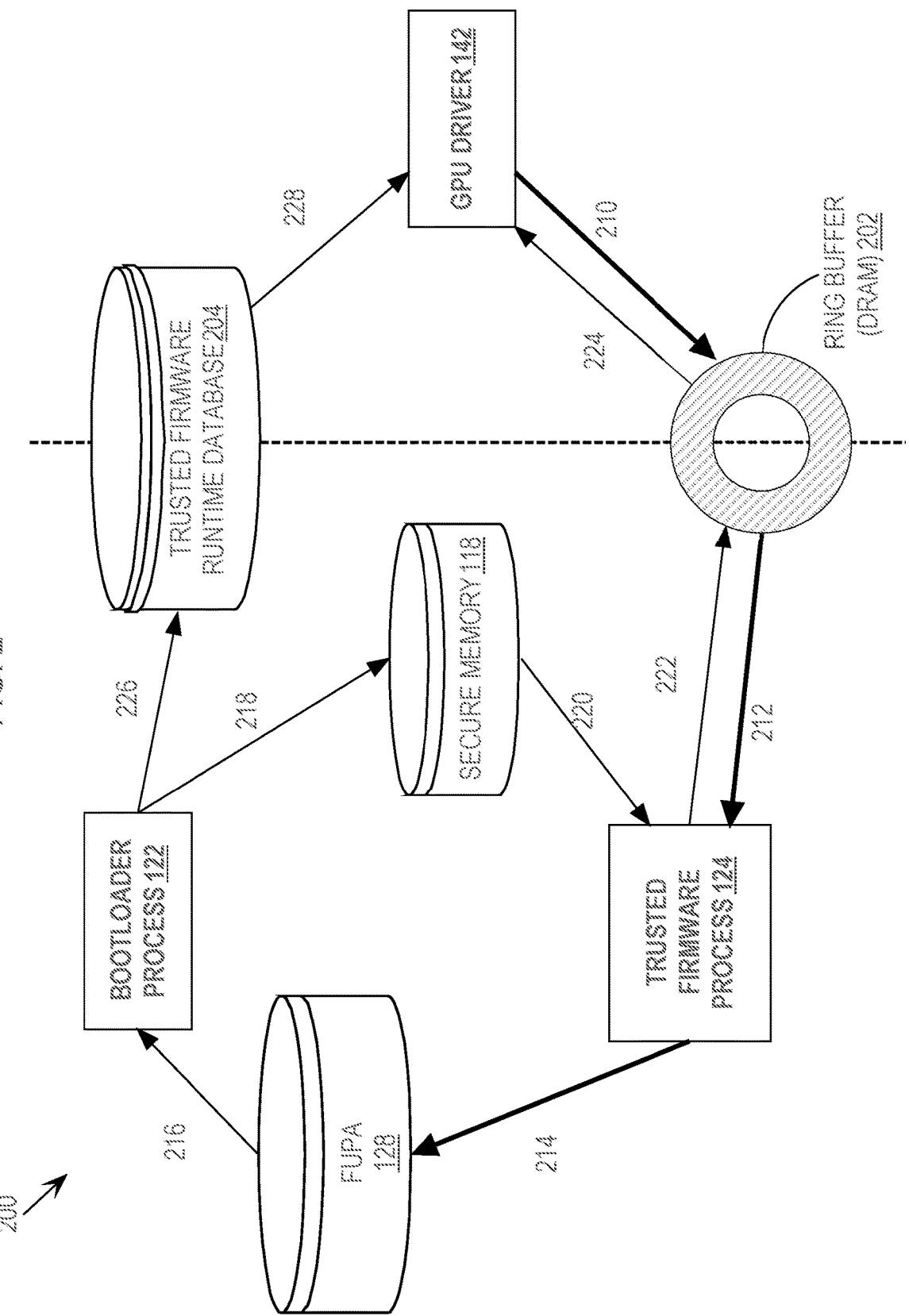
FIG. 2 depicts a flowchart for recording boot override information to persistent storage, and then a bootloader process applying the persistently-stored boot override information during subsequent implementation of a boot sequence.

FIG. 2 depicts a flowchart 200 for recording boot override information to persistent storage, and a bootloader process applying the persistently-stored boot override information during subsequent implementation of a boot sequence for the computing device. Specifically, in response to a request to adjust functionality of a boot-time feature of a computing device, boot configuration information is written to persistent storage, the boot configuration information indicating the requested adjustment to the functionality of the boot-time feature. For example, GPU driver 142 receives an instruction from a user (e.g., through a user interface) to adjust a setting of a boot-time feature. To illustrate, a user instructs GPU driver 142 to persistently disable memory-interconnect and to persistently set a block size parameter for DRAM ECC to 2048 KB.

According to various implementations, the request to adjust the functionality of a boot-time feature may be a request to perform any kind of change to the functionality or parameters of a boot-time feature, such as enabling the feature, disabling the feature, changing a configuration of the feature, selecting a value used by the feature, etc.

Based on these user instructions, GPU driver 142 stores the requested configuration changes to a ring buffer 202, e.g., residing in GPU memory 114 (step 210). Trusted firmware 124 retrieves the requested configuration change information from ring buffer 202 (step 212) and writes one or more boot override records reflecting the requested configuration change information to FUPA 128 (step 214). For example, trusted firmware process 124 stores the one or more boot override records to GPU storage device 112 using a generic SPI interface exposed for GPU storage device 112. Because the one or more boot override records are stored in persistent storage (e.g., EEPROM), the stored records persist across power cycles.

FIG. 3 depicts FUPA 128 with an example boot override record 300 written to FUPA 128 by trusted firmware process 124. While FIG. 3 depicts a single boot override record in FUPA 128, according to various implementations, multiple boot override records may be written to FUPA 128, where each record includes configuration data for an associated boot-time feature.

In the example of FIG. 3, boot override record 300 includes boot-time feature configuration data, an HMAC tag, and a timestamp. However, an override record may include any type of information, including an invalidation bit, a version number, a write count, a cookie, etc. Record 300 indicates that memory-interconnect should be disabled ("MEMORY_INTERCONNECT_ENABLED=FALSE"), and also sets a block size for DRAM ECC ("GDDR6_ECC_BLOCK_SIZE=2048"). The example boot override records includes boot-time configuration data expressed as parameter names and desired setting values. However, according to various implementations, the boot-time configuration data in an override record comprises a boot-configuration bit mask that, when applied to the boot-level feature configuration data maintained by bootloader process 122 in secure memory 118, makes bit-wise changes to the configuration data that adjust the configuration of bootloader process 122 as requested by GPU driver 142.

According to various implementations, trusted firmware process 124 includes, in a boot override record stored in FUPA 128, a timestamp representing a calendar time (e.g., in seconds), e.g., passed from GPU driver 142 to trusted firmware process 124 with the request to dynamically adjust the boot-time configuration. This timestamp may be read by GPU driver 142 when it queries trusted firmware process 124 for the current boot config data stored in FUPA 128.

According to various implementations, trusted firmware process 124 includes, with a boot override record stored in FUPA 128, a cookie that is used to ensure integrity of the record. For example, a cookie stored with an override record is the last thing written for the boot override record and the first thing read by bootloader process 122. By ensuring that the cookie is the last thing written for an override record, trusted firmware process 124 indicates that the override record was written without disruption or error. Furthermore, because the cookie is the first thing read by bootloader process 122, the process may ensure, in turn, that the override record was written without disruption or error, which is a check on the integrity of the data. Furthermore, if multiple boot override records are stored to FUPA 128, one or more of the boot override records may be associated with a distinct cookie.

According to various implementations, prior to writing boot override information to FUPA 128, trusted firmware process 124 determines whether a number of writes executed on GPU storage device 112 exceeds a high water-mark and/or whether the requested boot-time configuration changes are already being applied to the boot-time configuration (step 220). The one or more boot override records are written to FUPA 128 in response to determining that the recorded number of writes executed on GPU storage device 112 does not exceed the high water-mark number of writes and that the boot-time configuration changes represented by the one or more boot override records are not yet being applied to the boot-time configuration of the device. Such checks ensures that the requested SPI-ROM writes are not superfluous, and that hardware implementing GPU storage device 112 does not exceed a critical number of writes, at which point the hardware becomes worn and ceases to function properly. According to various implementations, a number of writes to GPU storage device 112 is also limited to a boot cycle-specific maximum number per boot cycle.

After writing the boot configuration information to the persistent storage, a bootloader process implements a boot sequence for the computing device. For example, GPU 110 undergoes a cold reboot or warm reboot, based on which bootROM process 120 is initialized. BootROM process 120 initializes bootloader process 122, which reads one or more boot override records from FUPA 128 (step 216), such as boot override record 300.

The bootloader process implements the requested adjustment to the functionality of the boot-time feature based on the retrieved boot configuration information. For example, bootloader process 122 writes the retrieved boot override information from FUPA 128 into secure memory 118 (step 218), which is only accessible by trusted actors within TEE 130.

According to various implementations, bootloader process 122 verifies that the one or more retrieved records are from a trusted source once they are in secure memory 118, as described in further detail below. Because the source verification is performed within secure memory 118, which only trusted actors may access, the data will not be maliciously replaced after the source of the data is validated. Bootloader process 122 uses the copy of configuration data in secure memory 118, which ensures that the one or more boot override records used to adjust the boot-time features of GPU 110 are the validated one or more records recorded by the trusted actor. This minimizes a Time of Check Time of Use (TOCTOU) security concern which would open up a security exploitation window, had the dynamic boot configuration been validated inside GPU storage device 112 instead of secure memory 118.

According to various implementations, bootloader process 122 further writes the runtime boot configuration, with requested boot override adjustments applied thereto, to a trusted firmware runtime database 204, e.g., within GPU memory 114 (step 226). GPU driver 142 reads the runtime boot configuration information within runtime database 204 (step 228), and makes information from the runtime boot configuration information available to a user via a user interface.

Furthermore, GPU driver 142 may read the current boot configuration data stored for GPU 110. Specifically, trusted firmware process 124 writes the current boot configuration data to ring buffer 202 (step 222), and GPU driver 142 is configured to this data from ring buffer 202 (step 224).

4. Security of FUPA

According to various implementations, the boot cycle of GPU 110 is a secure boot cycle, which is a trusted process that is verified (e.g., using encryption, secure memory, etc.) to ensure that implementation of the boot cycle is secure. For example, as indicated above, at least bootROM process 120, bootloader process 122, and trusted firmware process 124 are run in TEE 130 of GPU 110.

Basing any part of the boot sequence on information from SPI-ROM outside of the verified firmware, e.g., a boot override record from FUPA 128, makes the boot process of GPU 110 vulnerable to malicious attacks, such as corruption of the boot cycle or boot-level features based on bad information inserted into FUPA 128 via software- or hardware-based insertions. Thus, various implementations ensure that the configuration information in FUPA 128 is from a trusted source, i.e., from a trusted actor within the same TEE 130 as bootloader process 122. Ensuring that the configuration information in FUPA 128 is from a trusted source prevents any potential attacks that might be enacted using spoofed configuration information in FUPA 128.

Thus, according to an implementation, one or more boot override records are written to FUPA 128 with message authentication codes (MACs), such as keyed-hash message authentication code (HMAC) tags, to verify the authenticity of the source of the configuration information. These HMAC tags are generated independently and authenticated by different trusted actors within TEE 130 (generated by trusted firmware process 124 and authenticated by bootloader process 122), which, in general, do not execute simultaneously. Furthermore, the generation of an HMAC tag and the authentication of the HMAC tag are done in different boot cycles. Thus, the actors generating and authenticating the HMAC tag must be able to derive the same HMAC key during different boot cycles, and it should be impossible for actors that are not within TEE 130 to generate the same HMAC key.

To allow the various trusted actors within TEE 130 to generate the same HMAC keys for boot override records, HMAC keys are derived based on a seed value that is stored in an obfuscated manner as a hard-coded value in firmware and a key embedded in hardware for GPU 110 also in an obfuscated manner. For example, HMAC tags are generated for boot override records using SHA-256 (or, e.g., a higher-security hash function such as SHA-384 or SHA-512) during various boot cycles based on an HMAC key. According to various implementations, the HMAC key is a symmetric key derived using an obfuscated value which can also be known as an encrypted Chip Endorsement Fused Secret (CEFS) (e.g., hard-coded in Security firmware) as a seed/entropy source. The CEFS is encrypted by virtue of being hard-coded into the encrypted Security firmware.

A one-time password (OTP) key that is unique to GPU 110, e.g., tied to a manufacturer serial number, is used to decrypt the CEFS, which prevents authenticated information from being copied from one computing device to be applied to another computing device. Only trusted actors in TEE 130 have access to the secure, fused region of GPU 110 hardware storing the OTP key (in an obfuscated format) through a crypto-engine (either hardware crypto accelerator or software crypto library). The crypto-engine is configured to retrieve the OTP key from hardware of GPU 110 and deobfuscate the retrieved OTP key.

Accordingly, to decrypt the CEFS, the crypto-engine retrieves and de-obfuscates the OTP key and securely stores the OTP key, e.g., in secure memory 118. The CEFS is decrypted, e.g., using Advanced encryption standard (AES) Electronic codebook (ECB) decryption, based on the OTP key. The trusted actors in TEE 130 have access to the same CEFS and OTP key, which gives actors implementing all stages of the boot cycle/sequence access to the same seed for deriving the needed HMAC keys.

Using the decrypted CEFS, an HMAC key may be reliably derived. Specifically, to derive the HMAC key from the decrypted CEFS, any technique that uses a seed to deterministically generate an HMAC key that cannot be reverse-engineered to determine the seed may be employed to generate the HMAC key. Using a deterministic technique to generate an HMAC key from a seed means that the same HMAC key is generated any time the deterministic technique is used on the same seed and for the same base information.

To illustrate, once a trusted actor in TEE 130 (e.g., bootloader process 122 or trusted firmware process 124) retrieves the CEFS from the CCP, the trusted actor may generate an HMAC key from the CEFS as described above. According to various implementations, trusted firmware process 124 uses the generated HMAC key to generate an HMAC tag for an override record stored in FUPA 128, which is stored with the override record. In the example of FIG. 3, record 300 is stored with an HMAC key "HMAC1", which trusted firmware process 124 generated as described above.

After record 300 is stored in FUPA 128, GPU 110 is rebooted during which bootloader process 122 is initiated by bootROM process 120. According to various implementations, trusted firmware process 124 automatically causes GPU 110 to reboot to apply the changes. When bootloader process 122 reads boot override record 300 as described above, bootloader process retrieves the decrypted CEFS from the CCP and independently generates an HMAC key for the record. Because the HMAC keys are generated from the same CEFS as was used by trusted firmware process 124 to generate the stored HMAC tags, bootloader process 122 is able to verify that the HMAC tags were generated by a trusted actor in the same TEE 130.

If bootloader process 122 determines that an HMAC tag associated with an override record is not authentic, i.e., the stored tag does not match an HMAC tag generated by bootloader process 122 for the override record, bootloader process 122 treats the override record as invalid and does not apply the configuration information represented by the record to boot-time features for GPU 110.

5. Facilitating Mutually-Exclusive Boot-Time Features

At times, there are mutually-exclusive boot-time feature options, which cannot be enabled on the same boot cycle (which represents the time between booting a computing device and rebooting the device). According to various implementations, using boot override records described above, two mutually-exclusive boot-time features can be enabled on a computing device during two contiguous boot cycles of the host user's choosing.

For example, a first set of boot features (e.g., Set A: Boot Feature 1A, 2A, 3A) is mutually-exclusive with a second set of boot features (e.g., Set B: Boot Feature 1B, 2B, 3B) such that no element of Set A can be enabled in the same boot cycle as an element in Set B and no element of Set B can be enabled in the same boot cycle as an element in Set A. Furthermore, an element in Set A can be enabled in the same boot cycle as any other element in Set A. Similarly, an element in Set B can be enabled in the same boot cycle as any other element in Set B.

According to various implementations, provided that each set of boot features has warm reset persistence (i.e., no SOC voltage rails are toggled on reset, and the reset simply involves the Security Firmware, e.g., any process in TEE 130, jumping back to its bootcode instruction (mapped in boot ROM), such that each feature in the previously initialized set will retain its previous SOC state on this second boot cycle), boot override records may be used to enable the different sets of features during different boot cycles.

For example, DRAM ECC cannot be enabled in the same boot cycle as Two-Stage Memory Training. As described in further detail below, boot override records may be used to enable DRAM ECC and Two-Stage Memory Training where the first cycle enables memory long training to generate learned memory training parameters 126 (i.e., Built-In Self Test (GIST) data) that are then used in a subsequent boot cycle for short training (leveraging learned memory training parameters 126 instead of retraining the memory DIMMs) prior to enabling DRAM ECC, which will scrub the entire memory to allow for data parity measurements to be taken of all content written to the memory in I/O operations.

5.1. Two-Stage Memory Training

GPU memory training runs at startup of the device to identify settings for GPU memory 114 that optimize the system. Such training is expensive and can cause the GPU to delay normal functionality, on the order of seconds-long delay. Such a delay is generally tolerable upon initial startup (at cold reboot), but it is good to avoid the delay in normal functionality on warm reboot of the GPU (such as Sleep or Hibernate scenarios). Two-Stage Memory Training is a boot-time GPU feature that causes memory training to be performed once on cold reboot (the first stage of training), and stores the learned memory training parameters 126 in GPU memory 114 for use on subsequent warm reboot (e.g., coming back from a sleep or hibernation mode).

5.2. Error Correction Codes

DRAM ECC is a boot-time feature that verifies the accuracy of data stored in GPU memory 114 using parity measurements. When DRAM ECC is enabled, GPU memory 114 is cleared out so that everything stored in memory may be associated with calculated parity measurements. DRAM ECC then causes all I/O for GPU memory 114 to be tracked to calculate parity bits for each operation. Based on the parity measurements, it is possible to identify/ correct errors. For example, standard Single Error Correct Double Error Detect (SECDED) DRAM ECC schemes allows the GPU to automatically identify 1 and 2-bit errors using the calculated parity measurements, and to automatically correct 1-bit errors within the memory. Any data resident within GPU memory 114 upon enabling DRAM ECC will be identified as including errors given the lack of parity measurements for the resident data.

5.3. Incompatibility of Two-Stage Memory Training and Dram ECC During the Same Boot Cycle Because GPU memory 114 must not contain data when DRAM ECC is enabled, DRAM ECC enablement causes the learned memory training parameters 126, learned during the first stage of Two-Stage Memory Training and stored in GPU memory 114, to be erased. Thus, enablement of DRAM ECC during the same boot cycle as Two-Stage Memory Training effectively negates the Two-Stage Memory Training features.

5.4. Using Persistence of Boot-Time Feature Setting Adjustments to Enable Interoperability of Mutually-Exclusive Features It can be important to allow interoperability of mutually-exclusive features. For example, some users will want both data resilience from DRAM ECC and fast memory training from Two-Stage Memory Training during the same boot cycle. Accordingly, techniques described herein allow interoperability of two mutually exclusive features using boot override records described above. Specifically, GPU driver 142 orchestrates implementation of a first boot-time feature that supports Sticky/Warm Reboot persistent enablement during a first boot cycle, and then disablement of one or more incompatible aspects of the first boot-time feature with implementation of a second boot-time feature in a second boot cycle to allow the features to inter-operate.

For example, a user indicates to GPU driver 142 (e.g., via a user interface provided by the driver) that the user would like to enable both DRAM ECC and Two-Stage Memory Training. Accordingly, GPU driver 142 causes vBIOS firmware 116 to include a default setting that the Two-Stage Memory Training feature is enabled. Based on this setting, during the boot sequence of GPU 110, bootloader process 122 initializes Two-Stage Memory Training. Implementation of Two-Stage Memory Training during the boot cycle causes the first stage of memory training to occur, which results in learned training parameters 126 being stored in secure memory 118.

After learned training parameters 126 are stored to secure memory 118, GPU driver 142 causes trusted firmware process 124 to store, in FUPA 128, one or more boot override records with instructions to disable Two-Stage Memory Training, and to enable DRAM ECC. Then GPU 110 is warm-rebooted. According to various implementations, GPU 110 is automatically warm-rebooted by bootloader process 122 after storing the one or more boot override records with instructions to disable Two-Stage Memory Training, and to enable DRAM ECC to FUPA 128.

On the boot cycle after the boot override record is stored in FUPA 128, bootloader process 122 reads the one or more boot override records in FUPA 128 (as described in detail above), which includes the one or more boot override records with instructions to disable Two-Stage Memory Training and to enable DRAM ECC. According to various implementations, bootloader process 122 is configured to determine whether any learned training parameters are stored in GPU memory 114 in response to identifying a boot override record to enable DRAM ECC. Continuing with the example above, bootloader process 122 identifies learned training parameters 126 in GPU memory 114. Responsive to identifying learned training parameters 126 in GPU memory 114, bootloader process 122 causes second-stage training of GPU memory (according to the second stage of Two-Stage Memory Training) to be performed using learned training parameters 126. After performing the second-stage training of GPU memory, bootloader process 122 wipes GPU memory 114 in preparation for enabling DRAM ECC.

According to various implementations, if the reboot of GPU 110 after storing a particular boot override record with instructions to disable Two-Stage Memory Training and to enable DRAM ECC is a cold reboot (in which GPU 110 is reset and all system state has been lost), after the reboot bootloader process 122 determines that learned training parameters 126 are not in GPU memory 114. Based on this determination, bootloader process 122 leaves the valid particular boot override record in FUPA 128, but does not implement the instructions. Specifically, bootloader process 122 first implements the default vBIOS configuration for Two-Stage Memory Training (i.e., to enable Two-Stage Memory Training) and treats the presence of the particular boot override instruction as a request from GPU driver 142 to implement DRAM ECC in the next boot cycle, as described in detail above.

According to various implementations, when Two-Stage Memory Training is desired to be re-implemented, GPU driver 142 requests an update to FUPA 128 to remove or invalidate the boot override record with instructions to disable Two-Stage Memory Training and enabled DRAM ECC. On the next warm or cold reboot, bootloader process 122 uses the default configuration and enables Two-Stage Memory Training. GPU driver 142 may then update FUPA 128 with boot-level configuration data requesting disablement of Two-Stage Memory Training and enablement of DRAM ECC, which is handled as described above.

6. Memory-Interconnect

Application of the boot-time feature configuration data reflected in a boot override record may change aspects of a static vBIOS configuration, e.g., in vBIOS firmware 116, used by early bootloading processes to implement boot-time features, as described above. Furthermore, application of boot-time feature configuration data may affect behavior of bootloader process 122 other than the behavior driven by the static vBIOS configuration. To illustrate, disablement of memory-interconnect causes deactivation of functionality that utilizes hardware (i.e., a bridge card) connecting GPU 110 to other computing devices in a GPU Hive.

Specifically, memory-interconnect (such as inter-chip global memory interconnect (xGMI) is a data plane standard that connects multiple GPUs in a Hive, and may be embodied physically by a bridge card that sits on top of a Hive of GPUs, connecting them together. If a bridge card is physically connected to GPU 110, it drives high GPIO pins on the GPU, which causes bootloader process 122 to detect the presence of the bridge card during the boot cycle. In response to detecting the bridge card, bootloader process 122 attempts to train memory-interconnect links, initialize the bridge card, establish mastership election for the Hive, and discover the Hive Topology. This information is later communicated down by the trusted firmware process 124 to GPU driver 142, so GPU driver 142 can appropriately schedule workloads on the Hive and identify special communication if needed to the Master of the Hive. The memory-interconnect functionality is primarily used in data center GPU deployments where machine learning or high-performance computing (HPC) workloads may be queued on a GPU Hive, leveraging the GPU for its compute units rather than for graphics rendering.

In some implementations, without using boot override records as described herein, removing a GPU from a GPU Hive would require physically removing the bridge card from the GPU. However, it is not possible to detach the bridge card on a running system since the card is screwed in via jack screws and removal would require a power cycle to reset the GPU. Also, the bridge card is fairly fragile and susceptible to static electrical damage, and is not meant to be a screwed on and screwed off frequently.

A number of users (e.g., data center customers) require the flexibility to disable memory-interconnect without the need to physically modify the deployment by removing bridge cards. As described above, using boot override records reflecting dynamic boot configuration data, GPU driver 142 may disable memory-interconnect and trigger any kind of GPU reset (warm, cold, power cycle) at any point immediately after the dynamic over-ride or at any point after. On the next boot cycle, the bootloader process 122 will see the boot override record, and, based on the memory-interconnect disablement instruction in the record, ignore the physical presence of the bridge card and boot GPU 110 individually instead of as part of a Hive.

7. Hardware Overview

According to various implementations, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be any computing device, such as an SoC or other computing system, that incorporates hard-wired and/or program logic to implement the techniques.

As indicated above, FIG. 1 is an example block diagram that illustrates a SoC 100 upon which techniques described herein may be implemented. SoC 100 includes an I/O subsystem ("bus") 165 or other communication mechanism for communicating information, and a hardware processor, CPU 140, coupled with bus 165 for processing information. In the example of FIG. 1, CPU 140 is a general-purpose microprocessor.

SoC 100 also includes memory 150, such as a random access memory (RAM) or other dynamic storage device, coupled to bus 165 for storing information and instructions to be executed by processors on SoC 100. Memory 150 or memory 114 also may be used for storing temporary variables or other intermediate information during execution of instructions by a processor on SoC 100. Such instructions, when stored in non-transitory storage media accessible to CPU 140 or GPU 110, render SoC 100 into a special-purpose machine that is customized to perform the operations specified in the instructions. Storage devices 160 and 112, which may be implemented as one or more of magnetic disks, optical disks, or solid-state drives are provided for storing information and instructions.

SoC 100 may implement the techniques described herein using customized hard-wired logic, one or more ASICs or FPGAs, firmware and/or program logic, which in combination with the computer system causes or programs SoC 100 to be a special-purpose machine. According to various implementations, the techniques herein are performed by SoC 100 in response to CPU 140 or GPU 110 executing one or more sequences of one or more instructions contained in memory. Such instructions may be read into memory 150 or memory 114 from another storage medium, such as storage device 160 or storage device 112. Execution of the sequences of instructions contained in memory causes CPU 140 or GPU 110 (or any other processor on the SoC) to perform the process steps described herein. In alternative implementations, hard-wired circuitry may be used in place of or in combination with software instructions. In FIG. 1, SoC 100 is also coupled, via bus 165 to an external, locally-accessible, storage device 190 that comprises storage media.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 160 or storage device 112. Volatile media includes dynamic memory, such as memory 150 or memory 114. Common forms of storage media include, for example, hard disk, solid-state drive, magnetic data storage medium, a CD-ROM, any other optical data storage medium, any physical medium with patterns of holes, a RAM, a PROM, and EPROM, EEPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 165. Transmission media can also take the form of acoustic or light waves, such as those generated during radio-wave and infra-red data communications.

Various forms of media may be involved in carrying one or more sequences of one or more instructions to CPU 140 or GPU 110 for execution. For example, the instructions may initially be carried on a magnetic disk or solid-state drive of a remote computer. The remote computer can load the instructions into its dynamic memory and send the instructions over a network. A communication interface 170 of SoC 100 can receive the data from the network and appropriate circuitry can place the data on bus 165. Bus 165 carries the data to memory 150 or memory 114, from which CPU 140 or GPU 110 retrieves and executes the instructions. The instructions received by memory may optionally be stored on a storage device either before or after execution by CPU 140 or GPU 110.

Communication interface 170 of SoC 100 is coupled to bus 165, and provides a two-way data communication coupling to a network link 180 that is connected to a local network 182. For example, communication interface 170 may be a local area network (LAN) card to provide a data communication connection to a compatible LAN. Wireless links may also be implemented. In any such implementation, communication interface 170 sends and receives electrical, electromagnetic, or optical signals that carry digital data streams representing various types of information.

Network link 180 typically provides data communication through one or more networks to other data devices. For example, network link 180 may provide a connection through a network 182 to storage device 184. Network 182 uses electrical, electromagnetic, or optical signals that carry digital data streams. The signals through the various networks and the signals on network link 180 and through communication interface 170, which carry the digital data to and from SoC 100, are example forms of transmission media.

SoC 100 can send messages and receive data, including program code, through the network(s), network link 180 and communication interface 170. For example, an external computing device (not depicted in FIG. 1) might transmit, to SoC 100, a firmware update for GPU 110 through network 182 and communication interface 170. The received code may be executed by SoC 100 as it is received, and/or stored in storage device 160 or storage device 112, or other non-volatile storage for later execution.

The invention claimed is:

1. A computer-executable method comprising:
in response to a request to adjust functionality of a boot-time feature of a computing device, writing boot configuration information to persistent storage, the boot configuration information indicating the requested adjustment to the functionality of the boot-time feature;
after writing the boot configuration information to the persistent storage, a bootloader process implementing a boot sequence for the computing device;
while implementing the boot sequence:
the bootloader process having at least two boot stages and reading the boot configuration information from persistent storage, and
the bootloader process implementing the requested adjustment to the functionality of the boot-time feature based on the boot configuration information, where one or more aspects of a first boot-time feature are incompatible with a second boot-time feature, wherein the first boot-time feature is enabled during a first boot stage and the first boot-time feature is disabled during a second boot stage.

2. The computer-executable method of claim 1, further comprising:
restarting the computing device;
wherein said restarting the computing device comprises a second instance of starting the bootloader process;
wherein, after the second instance of starting the bootloader process, the bootloader process uses the boot configuration information from the persistent storage to implement the requested adjustment to the functionality of the boot-time feature.

3. The computer-executable method of claim 1, further comprising:
generating a message authentication code (MAC) based on (a) at least a portion of the boot configuration information, and (b) a MAC key;
writing the MAC to the persistent storage;
prior to the bootloader process implementing the requested adjustment to the functionality of the boot-time feature based on the boot configuration information:
the bootloader process authenticating the MAC based on the MAC key;
wherein said implementing the requested adjustment to the functionality of the boot-time feature based on the boot configuration information is performed in response to successfully authenticating the MAC.

4. The computer-executable method of claim 3, further comprising copying the boot configuration information to secure memory, wherein said authenticating the MAC based on the MAC key is performed while the boot configuration information is in secure memory.

5. The computer-executable method of claim 3, further comprising deriving the MAC key based on an obfuscated value that is hard-coded in firmware for the computing device.

6. The computer-executable method of claim 5, further comprising:
wherein the bootloader process and a particular actor that generates the MAC are within a trusted execution environment;
wherein the obfuscated value is encrypted;
a crypto-engine retrieving a decryption key from hardware of the computing device; and
the crypto-engine providing the decryption key to the bootloader process and the particular actor, based on the bootloader process and the particular actor being within the trusted execution environment.

7. The computer-executable method of claim 6, wherein further comprising, prior to deriving the MAC key, decrypting the obfuscated value using the decryption key.

8. The computer-executable method of claim 1, wherein the requested adjustment to the functionality of the boot-time feature comprises at least one of: a request to enable the boot-time feature; a request to disable the boot-time feature; a request to change a configuration for the boot-time feature; or a request to select a value used by the boot-time feature.

9. The computer-executable method of claim 1, further comprising receiving the request to adjust the functionality of the boot-time feature from driver software for the computing device.

10. The computer-executable method of claim 1, wherein the computing device may be or comprise a GPU, a CPU, or an APU.

11. The computer-executable method of claim 1, wherein:
writing the boot configuration information is performed while a second boot-time feature, of the two mutually-exclusive boot-time features, is enabled for the computing device;
the boot configuration information indicates (a) enablement of the first boot-time feature and (b) disablement of one or more aspects of the second boot-time feature; and
the bootloader process using the boot configuration information to implement the requested adjustment causes enablement of the first boot-time feature and disablement of the one or more aspects of the second boot-time feature.

12. The computer-executable method of claim 11, wherein:
the second boot-time feature causes an action to be performed based, at least in part, on particular data stored in memory for the computing device;
the first boot-time feature requires the memory for the computing device to be cleared;
the method further comprises the bootloader process performing the action prior to causing enablement of the first boot-time feature;
wherein causing enablement of the first boot-time feature clears the memory for the computing device.

13. The computer-executable method of claim 12, wherein:
the particular data, stored in the memory, is persistent across warm resets of the computing device; and
the bootloader process is started in connection with a warm reset of the computing device.

14. The computer-executable method of claim 11, wherein the first boot-time feature is error correcting codes, and the second boot-time feature is two-stage memory training.

15. A computing system comprising:
one or more processors; and
memory that stores instructions that, when executed by the one or more processors, cause:
in response to a request to adjust functionality of a boot-time feature, writing boot configuration information to persistent storage, the boot configuration information indicating the requested adjustment to the functionality of the boot-time feature;
after writing the boot configuration information to the persistent storage, a bootloader process implementing a boot sequence;
while implementing the boot sequence:
the bootloader process having at least two boot stages and reading the boot configuration information from persistent storage, and
the bootloader process implementing the requested adjustment to the functionality of the boot-time feature based on the boot configuration information, where one or more aspects of a first boot-time feature are incompatible with a second boot-time feature, wherein the first boot-time feature is enabled during a first boot stage and the first boot-time feature is disabled during a second boot stage.

16. The computing system of claim 15, wherein the instructions further comprise instructions that, when executed by the one or more processors, cause:
restarting a particular processor;
wherein said restarting the particular processor comprises a second instance of starting the bootloader process;
wherein, after the second instance of starting the bootloader process, the bootloader process uses the boot configuration information from the persistent storage to implement the requested adjustment to the functionality of the boot-time feature.

17. The computing system of claim 15, wherein:
writing the boot configuration information is performed while a second boot-time feature, of the two mutually-exclusive boot-time features, is enabled;
the boot configuration information indicates (a) enablement of the first boot-time feature and (b) disablement of one or more aspects of the second boot-time feature; and
the bootloader process using the boot configuration information to implement the requested adjustment causes enablement of the first boot-time feature and disablement of the one or more aspects of the second boot-time feature.

18. One or more non-transitory computer readable media storing instructions that, when executed by one or more processors, cause:
in response to a request to adjust functionality of a boot-time feature, writing boot configuration information to persistent storage, the boot configuration information indicating the requested adjustment to the functionality of the boot-time feature;
after writing the boot configuration information to the persistent storage, a bootloader process implementing a boot sequence;
while implementing the boot sequence:
the bootloader process having at least two boot stages and reading the boot configuration information from persistent storage, and
the bootloader process implementing the requested adjustment to the functionality of the boot-time feature based on the boot configuration information, where one or more aspects of a first boot-time feature are incompatible with a second boot-time feature, wherein the first boot-time feature is enabled during a first boot stage and the first boot-time feature is disabled during a second boot stage.

19. The one or more non-transitory computer readable media of claim 18, wherein the instructions further comprise instructions that, when executed by one or more processors, cause:
restarting a particular processor;
wherein said restarting the particular processor comprises a second instance of starting the bootloader process;
wherein, after the second instance of starting the bootloader process, the bootloader process uses the boot configuration information from the persistent storage to implement the requested adjustment to the functionality of the boot-time feature.

20. The one or more non-transitory computer readable media of claim 18, wherein:
writing the boot configuration information is performed while a second boot-time feature, of the two mutually-exclusive boot-time features, is enabled;
the boot configuration information indicates (a) enablement of the first boot-time feature and (b) disablement of one or more aspects of the second boot-time feature; and
the bootloader process using the boot configuration information to implement the requested adjustment causes enablement of the first boot-time feature and disablement of the one or more aspects of the second boot-time feature.

\* \* \* \* \*